April 28, 1970    M. WISMER ET AL    3,509,015
GLASS LAMINATED WITH POLYURETHANE
Filed Feb. 24, 1965

INVENTORS
MARCO WISMER
VERNON GIBBS AMMONS
MICHAEL EDWARD DUFALA

BY Chisholm and Spencer
ATTORNEYS

United States Patent Office 3,509,015
Patented Apr. 28, 1970

3,509,015
GLASS LAMINATED WITH POLYURETHANE
Marco Wismer, Gibsonia, Vernon G. Ammons, Glenshaw, and Michael E. Dufala, Tarentum, Pa., assignors to PPG Industries, Inc., a corporation of Pennsylvania
Continuation-in-part of applications Ser. No. 68,942 and Ser. No. 68,943, both filed Nov. 14, 1960. This application Feb. 24, 1965, Ser. No. 435,017
Int. Cl. B32b *17/10;* C03c *27/12*
U.S. Cl. 161—190                                    36 Claims

ABSTRACT OF THE DISCLOSURE

Laminated glass articles suitable as safety glass windows and windshields for automobiles or other vehicles are made with a polyurethane interlayer. The polyurethane is a reaction product of a poly(oxypolymethylene) glycol; or organic polyisocyanate and a curing agent containing at least two active hydrogens per molecule. The curing agent can be a polyol or a polyamine and may be used with an excess of polyisocyanate. Preferably, a prepolymer of poly(oxytetramethylene) glycol is made and then cured. The curing can be carried out while the reaction mixture is in contact with the outer members of the laminate.

---

This application is a continuation-in-part of Ser. No. 68,942 and Ser. No. 68,943, both filed Nov. 14, 1960, and both now abandoned.

This invention relates to laminated glass articles, and more particularly to a laminated safety glass wherein the interlayer is composed of a polyurethane composition comprising a reaction product of a poly(oxypolymethylene) glycol.

Laminated glass articles are in wide use, chiefly in glass areas of automobiles, aircraft, and the like. A common term for such laminates used in these applications is "safety glass." Safety glass is a glass sandwich composed of an interlayer material bonding together two or more plates or sheets of glass with such adhesion between the glass and the interlayer that the breaking of the glass results in a minimum dispersion of fragments of broken glass.

In order for this resinous interlayer to be effective for this purpose, it must have a number of properties, including: (1) it must itself have a high impact energy absorption level so that it may withstand high impact from moving objects; high tensile strength and high percentage of elongation are measures of this property; (2) it must have good shear and tear strength to prevent rupture from the broken glass itself; (3) it must have good adhesion to the glass itself so as to prevent any broken pieces of glass from flying and injuring anyone nearby, that is, the glass-resin laminate should remain integral after it is broken; (4) it must have good and sustained optical transparency; and (5) it must have good weathering characteristics so that it properly performs its function after many years in use.

Prior to 1929, safety glass was generally of poor quality, especially at temperatures below freezing, because none of the resinous compositions which were used as interlayers up to that time maintained their elasticity and adhesion to glass at such temperatures. The more common interlayer compositions which were in use at that time included the acrylates, cellulose acetate, cellulose nitrate and gelatin. Moreover, the bond between the resinous interlayer and the glass sheets weakened with age.

Eventually the safety glass industry had come to use the autoclave as a means for lamination of the safety glass and a bond which was acceptable by the industry and the public was attained. Further refinements in the use of autoclaves, such as the "rubber bag" process and the preliminary pressing autoclave process, were later developed to ameliorate the problem of poor edge bonding. A plasticized vinyl alcohol polymer, partially reacted with butyraldehyde (U.S. Patent No. 2,120,628), was found to overcome brittleness at low temperatures and an acceptable safety glass was then developed which would be effective at low temperatures, especially when used in automobiles in the wintertime.

Although the polyvinyl alcohol which has been partially reacted with butyraldehyde (polyvinyl butyral) is in many respects excellent for use as an interlayer for safety glass, it must be employed in sheet form and subsequently laminated between glass sheets at high temperatures (240° F. to 300° F.) and at pressures between 150 and 200 pounds per square inch. Because of such process limitations, together with the cost of safety glass produced in this manner, laminated safety glass has not been employed as widely as the existing field of potential utility. For example, there are architectural applications for interlayers of many varied colors for glass structures having dimensions which cannot be made conveniently from starting materials in sheet form.

Many of the aforesaid limitations and disadvantages can be eliminated by the use of interlayers which are cast and by producing laminates by casting such materials between layers of glass. For instance, laminates with a cast and cured-in-place interlayer can be produced by a continuous process since curing can be accomplished while the unit moves through a tunnel oven, thus eliminating the autoclave which acts as a "bottleneck" in the conventional laminating procedure. Another advantage is that by casting the interlayer, intimate contact and uniform adhesion is obtained throughout the interface between the interlayer and the glass regardless of any imperfection which may be in the glass surface. In fact, laminated safety glass can be prepared in which the glass parts are deliberately placed in non-parallel positions. In addition, cast and cured-in-place interlayers would eliminate these presently necessary operations:

(1) washing and drying of the polyvinylbutyral sheeting;
(2) pattern cutting of the polyvinylbutyral sheeting, and
(3) washing away autoclave oil from the finished laminate.

Many resins have been tried as cast-in-place interlayers, but heretofore none was found to meet all of the aforementioned rigid requirements which are necessary in making an operative and acceptable safety glass. For example, the polyurethanes and alkyds utilized all suffered from brittleness at low temperatures and/or suffered from opaqueness or poor workability. Refinements, such as using partially acetylated castor oils in the making of a polyurethane, were not able to overcome the brittleness effects at low temperatures.

It has now been discovered that a certain specific type polyurethane composition can be employed successfully as cast and cured-in-place safety glass interlayers and that safety glass containing said interlayer material meets the rigid requirements necessary for commercially acceptable safety glass. In many characteristics, it far surpasses safety glass which is made with polyvinyl butyral interlayers.

The particular type of polyurethane which is employed as a resinous interlayer composition in the instant invention is made from a poly(oxypolymethylene) glycol, wherein the said glycol contains oxypolymethylene groups in which a linear chain of from about 3 to about 6 carbon atoms separate each adjacent pair of oxygen atoms.

Representative poly(oxypolymethylene) glycols include those of the formula

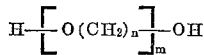

where $n$ is from 3 to 6 and $m$ can be varied considerably, e.g., from 2 to 30 or higher, preferably being between about 6 and about 20. Included are poly(oxytetramethylene) glycols, which are preferred, and poly(oxytrimethylene) glycols, which are also advantageously utilized, as well as poly(oxypentamethylene) glycols, and poly(oxyhexamethylene) glycols. Other poly(oxypolymethylene) glycols not within the above formula are also usable but are less desirable as a class; these include, for example, branched carbon chain compounds.

It is desirable that the poly(oxypolymethylene) glycol have a molecular weight between about 400 and about 3500. The preferred molecular weight range varies somewhat with the curing agent employed. For example, when a polyol is used to cure the system (along with excess polyisocyanate), the poly(oxypolymethylene) glycol preferably has a molecular weight between about 500 and about 2000, and when a curing system comprising a polyol with 3 or more hydroxyls and a diol is utilized, the preferred range is from about 500 to about 1800. With polyamine curing systems, the molecular weight is usually between about 500 and about 3000. Other materials, outside these ranges, can be employed and interlayers made therefrom have good optical transparency and have good adhesion to glass. However, safety glass made therefrom is less satisfactory because it tends to have poorer impact energy absorption level at either low or high temperatures. For instance, if the poly(oxypolymethylene) glycol has a molecular weight below the above ranges, the resinous compositions may become too brittle at low temperatures, and if the poly(oxypolymethylene) glycol has a higher molecular weight above these mentioned, the interlayer tends to lack rigidity at high temperatures, so that lowered impact resistance is attained.

The resinous compositions of the instant invention are prepared from the interaction of an organic polyisocyanate and a poly(oxypolymethylene) glycol, as defined above, and a curing agent containing at least about 2 active hydrogen atoms per molecule (the term "active hydrogen" herein refers to active hydrogen atoms as determined by the Zerewitinoff method, i.e., which are reactive with Zerewitinoff reagent).

Among the organic polyisocyanates that can be employed are the various organic compounds containing two or more isocyanato groups, or mixtures of such compounds, including aromatic, aliphatic and cycloaliphatic diisocyanates and triisocyanates, and combinations of these types. Representative compounds include 2,4-toluene diisocyanate, m-phenylene diisocyanate, 4-chloro-1,3-phenylene diisocyanate, 4,4'-diphenylene diisocyanate, 3,3'-dimethyl - 4,4' - diphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexyl diisocyanate, 4,4'-methylene-bis-(cyclohexyl isocyanate), 1,5-tetrahydronaphthylene diisocyanate, p-xylene diisocyanate, durene diisocyanate, and 1,2,4-benzene triisocyanate. Arylene diisocyanates, i.e., those in which each of the two isocyanate groups is attached directly to an aromatic ring are preferred. The sterically hindered types such as 3,5-diethylmethylene-bis-(4-phenylene isocyanate) and o,o'-diethyl-para-benzene diisocyanate, in which the two isocyanate groups differ greatly in reactivity, are also of interest. The diisocyanates may contain other substituents which do not react with isocyanate groups. In the case of the aromatic compounds, the isocyanate groups may be attached either to the same or to different rings. Dimers of monomeric diisocyanates, and di(isocyanatoaryl) ureas such as di-(3-isocyanato-4-methyl-phenyl) urea may be used.

Ordinarily, the amount of polyisocyanate utilized is sufficient to react one mole of polyisocyanate per hydroxyl equivalent of the poly(oxypolymethylene) glycol. However, this ratio is not critical except for obtention of optimum results, and higher or lower amounts can be employed. Higher amounts are preferred in certain cases, as is more fully described below, while lower amounts merely result in less than complete utilization of the glycol in the polyurethane products and may result in a plasticizing effect on the interlayer.

It is preferred to utilize the polyisocyanate and the poly(oxypolymethylene) glycol in the form of a so-called "prepolymer," in which the polyisocyanate is partially reacted with the glycol to form an isocyanato-terminated adduct, which is then cured. Prepolymers made from toluene diisocyanate and poly(oxytetramethylene) glycols are available commercially and have been extensively utilized in the practice of the invention.

The curing agent employed can be any organic compound containing at least two active hydrogens per molecule; preferably the active hydrogen is in hydroxyl groups, at least in part. Satisfactory products for many applications are produced from any such curing agent as long as the glycol used contains oxypolymethylene groups as described. However, for the obtention of interlayers of the best overall properties, certain curing systems are preferred. These include:

(1) Polyols, and especially those having at least three hydroryl groups. It is desirable to employ these along with an excess of polyisocyanate over the usual one mole per hydroxyl equivalent of the poly(oxypolymethylene) glycol.

(2) Polyols having at least 3 hydroxyl groups in conjunction with a diol.

(3) Polyamines, preferably also utilized with a polyol.

The polyol which is utilized as the curing agent in the presence of excess polyisocyanate can be a diol, such as ethylene glycol, 1,4-butanediol or 1,6-hexanediol, but preferred are polyols which have three or more labile hydrogen atoms per molecule and which are compatible with the reaction system, i.e., soluble in the reaction mass. Theoretically, there is no real limit as to the number of hydroxyl groups per molecule of the polyol. As a practical matter, however, the size of the molecule would ultimately affect the properties such as solubility, etc., and therefore make its use undesirable.

Polyols having up to 8 and even 10 hydroxyl groups per molecule have been shown to be operative. Examples of polyols which can be employed include trimethylolpropane, trimethylolheptane, trimethylolethane, pentaerythritol, sorbitol, castor oil, the reaction products of allyl alcohol with styrene, polyether polyols, polyester polyols, nitrogen-containing polyols (e.g., reaction products of alkylene oxides with urea or similar compounds), and others.

When a polyol is used as the sole curing agent, it is desirable to include in the reaction mass excess polyisocyanate over the amount required to react with the glycol to form an isocyanato-terminated prepolymer, that is, in excess of one mole of polyisocyanate per hydroxyl equivalent of glycol. Thus, it is preferred to use a total of more than 2 moles of polyisocyanate per mole of glycol. Preferably, a total of about 4 moles of polyisocyanate per mole of glycol is present, although twice this much or even more can be used. Generally, however, lowered pot life and other processing difficulties, as well as less than optimum properties, are encountered when too large an excess of polyisocyanate is present.

The interlayers of the invention may also be advantageously made by curing the prepolymer or glycol-polyisocyanate blend with a curing system comprising both a polyol having three or more hydroxyl groups and a diol. In such products the various polyols having 3 or more hydroxyls, such as those mentioned above, are employed along with any of a wide variety of diols, for example, the lower molecule weight glycols, such as ethylene, propylene, butylene, pentylene, and higher or substituted alkylene diols, and the various hydroxyl-substituted aryl compounds. Particularly useful are 1,4-butanediol, 2,2-bis(4-hydroxycyclohexyl) propane, 1,5-pentanediol, and 2-methyl-2-n-propyl-1,3-propanediol.

In these curing systems the polyol functions as a cross-linking agent and the diol as a chain extender. In order to obtain optimum results, the curing system is used in amounts so that the total of the labile hydrogen atoms is approximately stoichiometrically equal to the free isocyanate groups of the prepolymer. Generally, this means that the amount is within 5 percent above the stoichiometric point, and preferably is within 3 percent of stoichiometry.

In order to obtain the optimum results with the various molecular weight poly(oxypolymethylene) glycols, certain diol-polyol ratios should be employed, for example, there are preferably employed about 3.5 equivalents of diol for each equivalent of polyol with the higher molecular weights (1250 to 1800), about 6 equivalents of diol for each equivalent of polyol with the intermediate molecular weights (650 to 850), and about 9 equivalents of diol for equivalent of polyol with the lower molecular weights (about 500 to about 650). However, generally satisfactory resinous interlayer compositions can be made with ratios of diol to polyol ranging from 1.5:1 to 10:1.

It has also been found that the physical properties of the product can be changed to a certain extent by employing either a diol which imparts plasticizing properties to the final polymer or one which imparts rigidity to the final polymer, straight chain poly(butylene oxide) glycol being an example of the former and 2,2-bis(4-hydroxycyclohexyl) propane being an example of the latter. These can permit use of higher or lower molecular weight glycols than those mentioned.

Another type of curing system usable herein comprises a polyamine, preferably in conjunction with a polyol. While it is possible to use a polyamine alone as the curing agent for prepolymers made from poly(oxypolymethylene) glycols, these usually give feasible pot lives only with the higher molecular weight range glycols (e.g., 2000–3000). By adding different amounts of various polyols, it is possible to adjust the curing time of the resinous composition to prolong the pot life and also to employ lower molecular weight glycols with good results.

Polyamines having 2,3,4,5,6 or more reactive amine groups are operative. Particularly desirable are aromatic diamines, such as 4,4'-methylene-bis(2-chloroaniline), diamino diphenyl sulfone, 4,4-diaminobenzophenone and diallyl melamine. Other polyamines which may be used include the aminotriazines such as melamine and the alkyl substituted melamines, benzoguanamine, the aliphatic polyamines and other aromatic diamines such as ortho-, meta-, and para-phenylene diamine, and p,p'-methylene dianiline.

Any one of a wide variety of polyols can be utilized along with the polyamine. For example, the lower molecular weight glycols, such as ethylene, propylene, butylene, pentylene, and the higher alkylene diols can be used, as can lower molecular weight poly(alkylene oxide) glycols, such as polypropylene oxide glycol having a molecular weight between 250 and 400, and various hydroxyl-substituted aryl compounds. Particularly useful are 1,4-butanediol, 1,5-pentanediol, 2,2-bis(4-hydroxycyclohexyl) propane, reaction products of polyols with alkylene oxides, trimethylolpropane, trimethylolethane, pentaerythritol, castor oil, reaction products of allyl alcohol and styrene, and trimethylolheptane.

It is usually desirable that the labile hydrogen atoms of the polyamine-polyol curing system be stoichiometrically balanced with the isocyanate radicals of the prepolymer. However, fairly good properties are obtained when less than the theoretical amount of the labile hydrogen atoms are present, in which case many of the thus formed urea hydrogen atoms probably react with the remaining isocyanate radicals to produce cross-linking, wherein some of the nitrogens of the polyurea are tertiary and form a biuret-type linkage. While it is possible to use as little as 50 percent of the theoretical stoichiometric amount of the curing components, it is preferred that at least 80 percent of the stoichiometric amounts be employed; an excess over the theoretical amount can also be tolerated.

The resinous interlayer is ordinarily prepared by first heating a "prepolymer" of the glycol and polyisocyanate (or these components themselves) under a vacuum for about 1 to 2 hours. The prepolymer is then mixed with the curing agent in a suitable vessel. The mixture is then further heated under a vacuum in order to remove any gases which are present or which were entrained during the mixing. Removal of the trapped and entrained gases throughout the production of the laminate is desirable in order to avoid bubbles and the like.

The preparation of cast interlayer laminates can be carried out in many ways. A relatively simple but useful method is by either pouring uncured reaction mixture between two planar spaced glass plates or placing the mixture upon both plates and pressing them together. Multilayer safety glass wherein several glass and polyurethane layers are bonded together is produced similarly. In some cases, only one layer of glass is used along with the polyurethane interlayer, with the other interlayer surface being exposed or covered with a layer of plastic or other material; such laminates can be produced by casting the polyurethane between one glass sheet and another member (made of glass or other material) which is coated with a release agent. Spacers are usually employed around the perimeter to insure uniform thickness of the interlayer. In order to obtain optimum results, the glass-polyurethane assembly is cured, usually by heating to a temperature between about 200° F. and about 300° F. for at least one-half hour.

Various mechanical devices may be employed to aid in introducing the resinous material. One particularly advantageous method is to seal the periphery of two sheets of glass with a pressure sensitive tape, such as polyethylene terephthalate (Mylar) tape, and force the resinous interlayer with the aid of moderate pressure into the space between the sheets of glass. Maximum pressures between about 10 p.s.i.g. or less and about 100 p.s.i.g. are generally employed. The resinous material is conveniently forced through a self-closing valve which is held in place with the tape while the trapped air is discharged through an aperture in the taped seam at the top. The tape may or may not be left on during and after curing.

The accompanying drawings illustrate certain features of the invention and how it is used:

Figure 1:
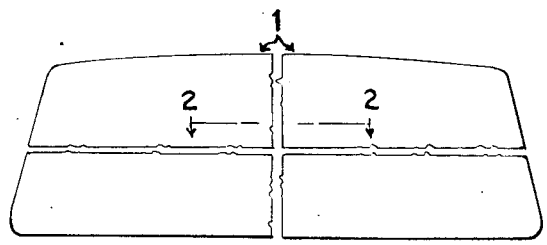
FIGURE 1 is an elevation of a laminated glass windshield.
Figure 2:
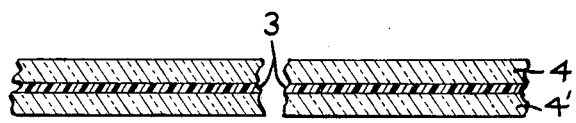
FIGURE 2 is a cross-sectional view 2—2 of FIGURE 1 representing a glass-polyurethane laminate of the instant invention.

The windshield of FIGURE 1 is represented generally by reference numeral 1. The laminate 2, represented by FIGURE 2, is the section defined by 2—2 of FIGURE 1 and is comprised of resinous polyurethane interlayer 3 sandwiched between glass sheets 4 and 4'. The casting cell of FIGURE 5 is comprised of parallel glass sheets 5 and 5', bound together at their periphery by Mylar tape 6, leaving space between them. Alternatively, sheet 5' can be of some other material, and can be coated with a release agent. Inlet 8 is provided for entry of the polyurethane interlayer material and air outlet 9 is provided to permit the discharge of air as the resinous interlayer material fills the chamber 7. At the inner end of inlet 8, it is expedient to employ a self-closing valve (not shown) in order to prevent the back flow of said uncured polyurethane.

Certain prepolymers of poly(oxypolymethylene) glycols are available commercially, and these are preferred in the invention. In other instances in which a prepolymer is desired, it can be prepared; a typical procedure is given below.

EXAMPLE A

The following were charged to a reaction vessel with thermometer, inlet gas tube and condenser.

| | Parts by weight |
|---|---|
| Poly(oxytetramethylene) glycol (mol. weight about 2800) | 828.9 |
| Toluene diisocyanate (80 percent 2,4-isomer and 20 percent 2,6-isomer) | 97.5 |

The reaction mixture was heated for 3 hours at temperatures between 167° F. and 176° F. The resultant product was a yellow viscous liquid which solidified at room temperature and had the following properties:

| | |
|---|---|
| NCO equivalent | 1709.7 |
| Color value (Gardner) | 5 |

In the examples of the invention given below, several commercially available prepolymers are utilized. That designated as Prepolymer A is made from poly(oxytetramethylene)glycol having a molecular weight of about 954 and toluene diisocyanate; it has a molecular weight of about 1320 and an NCO content of about 6.4 percent. The prepolymer termed Prepolymer B has a molecular weight of about 870 and an NCO content of about 9.34 percent; it is made from toluene diisocyanate and poly(oxytetramethylene) glycol with a molecular weight of about 522. In the examples, the toluene diisocyanate employed was the commercial mixture of 80 percent, 2,5-isomer and 20 percent, 2,6-isomer.

A number of tests are used in evaluate glass laminates, these being employed in the art to determine whether glass laminates can meet the standards of automobile and other manufacturers as well as regulations imposed by law in many states. The tests in the examples herein include the following:

Impact resistance

A half-pound steel ball is dropped onto the laminate from various heights to determine the maximum height at which the ball does not pass through or rupture the laminate. (The tests herein were carried out at a maximum height of 50 feet, which is the limit of the apparatus employed.) A separate laminate is used for each drop test and tests are performed at various temperatures above and below room temperature.

Heat resistance

The test laminate is subjected to progressively higher temperatures to determine at what point degradation of the interlayer occurs. The test laminate is also given prolonged exposure at a given temperature and examined periodically for any degradation of the interlayer, e.g., bubble formation. The interlayers described herein do not degrade when taken as high as 350° F. to 400° F. for as much as 20 to 30 hours or more, while standard polyvinyl butyral interlayers begin to bubble in 10 minutes or less at this temperature.

Other tests which are used and which the laminates of the present invention pass satisfactorily in most instances include:

Boiling water exposure

The test laminate is immersed in boiling water for 2 hours, removed and dried and then examined to determine if there is any penetration of moisture through the edges or if the appearance is marred with bubble formation.

Ultraviolet light exposure

The test laminates are exposed to both a mercury vapor lamp and a carbon arc (in a Fade-Ometer) and examined periodically for color change and other defects in the interlayer. A total exposure time of 1000 hours is used.

Outdoor exposure

The test laminates are exposed on racks at a test site in Florida for one year or more, after which the exposed specimens are examined for any changes.

Accelerated humidity exposure

The test laminates are exposed to essentially 100 percent relative humidity at 120° F. for a period of 2 weeks, stored for 2 days at 120° F. and then examined for edge effects, if any, such as separation and/or loss of adhesion by the interlayer.

Optical properties

Using a spectrophotometer, spectral curves are obtained for the specimens from which luminous transmittance can be determined. Also, haze measurements are made which are based on the degree of scattering of an incident light beam.

Adhesion rating by crushing

A section of a test laminate at 0° F. is broken by repeated hammer blows, and then the break is examined. The interlayer is considered to show proper adhesion to the glass if no bare spots of plastic can be detected.

Several examples of the invention are described below, illustrating the manner in which the polyurethane interlayers are produced and laminates are made therefrom using a cast-in-place technique. The examples are given only by way of illustration, not by way of limitation. All parts and percentages are by weight unless otherwise specified.

EXAMPLE 1

Figure 3:
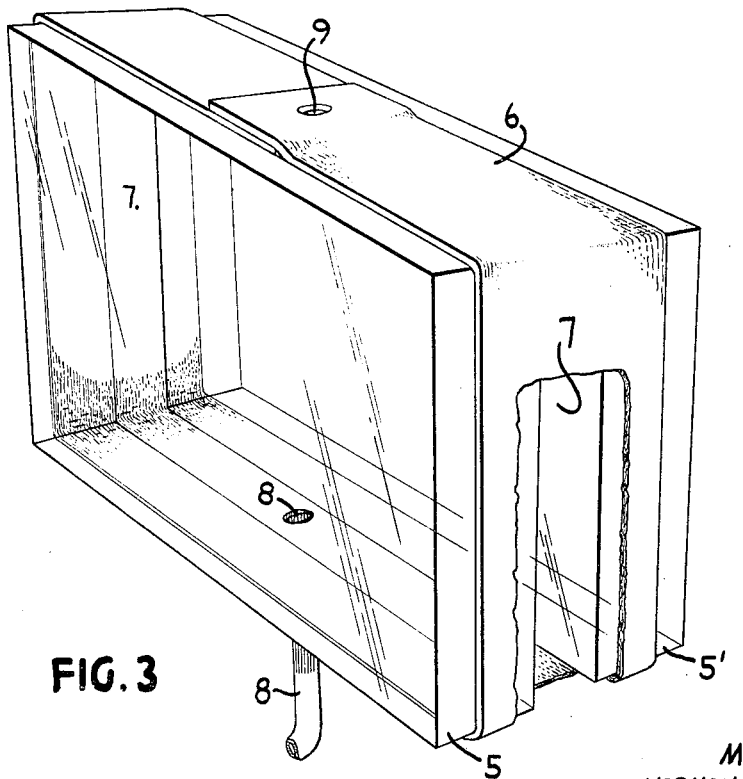
FIGURE 3 is an isometric view illustrating a casting cell which can be used to prepare glass laminates in accordance with the invention using a cast-in-place interlayer.

A series of laminates (A through E) were prepared using cast-in-place polyurethane interlayers made from poly(oxytetramethylene) glycol, toluene diisocyanate and trimethylolpropane. In A to D, Prepolymer A and additional toluene diisocyanate were combined with trimethylolpropane; in E only Prepolymer A and trimethylolpropane, with no additional toluene diisocyanate, were used. In each case, Prepolymer A was degassed for about 1½ hours at 200° F. and 2 millimeters pressure, and any additional toluene diisocyanate was added and degassing continued for 20 minutes. The trimethylolpropane was then added and this mixture was degassed for 5 minutes. The hot mixture was then placed in casting cells (similar to FIGURE 3 herein), each made from two 12-inch by 16-inch sheets of ⅛-inch thick plate glass 20, 60 or 100 mils apart and cured for 6 hours at 285° F. A 60 mil layer of the interlayer was also obtained (without glass plates) for tensile strength tests (Instron Tester, ASTM D628–61T). The compositions of the interlayers in this series are given in Table I.

TABLE I
[Interlayer compositions, parts by weight]

| | Prepolymer A | Toluene Diisocyanate | Trimethylolpropane |
|---|---|---|---|
| Laminate: | | | |
| A | 89.37 | 10.63 | 11.40 |
| B | 87.50 | 12.50 | 12.23 |
| C | 86.04 | 13.96 | 12.98 |
| D | 79.18 | 20.82 | 16.04 |
| E | 100.0 | | 6.75 |

The laminates prepared were then tested as described above and found to have excellent overall properties. The results of several representative tests are given in Table II. For comparison, corresponding values for a similar laminate made with "Aircraft Vinal" (25 mils thick, except for that used in the 200° F. impact test, which was 100 mils thick). "Aircraft Vinal" is a high quality plasticized polyvinyl butyral extensively used in aircraft safety glass.

TABLE II.—TEST PROPERTIES

| | Heat resistance [1] hrs. | Impact resistance [2] | | | Tensile strength, 365° F. p.s.i. |
|---|---|---|---|---|---|
| | | 0° F., feet | 120° F., feet | 200° F., feet | |
| Laminate: | | | | | |
| A | 12 | 34 | 30 | 40 | 258 |
| B | 19 | 12 | 32 | >50 | 279 |
| C | 19 | 10 | 35 | >50 | 243 |
| D | 25-30 | 10 | >35 | >50 | 285 |
| E | 19 | 49 | 10 | >50 | 217 |
| Aircraft Vinal | <10 min. | 10 | 49 | 32 | [3] 20 |

[1] Time to first sign of failure at 365° F., 60 mil interlayer.
[2] 0° F. and 120° F. on 20 mil interlayers, 200° F. on 100 mil interlayers.
[3] At 250° F. (0 p.s.i. at 300° F.).

Similar results were obtained with laminates made with interlayers in which diphenylmethane diisocyanate, bitoluene diisocyanate and 1,6-hexane diisocyanate were each substituted for the toluene diisocyanate in the above compositions (equivalent amounts based on NCO content being used).

EXAMPLE 2

A laminate was produced as in Example 1, using an interlayer of the following composition:

| | Parts by weight |
|---|---|
| Prepolymer A | 50.00 |
| Prepolymer B | 50.00 |
| 1,4-cyclohexanedimethanol | 13.46 |

The laminate had good properties, including impact resistance of 25 feet at 0° F. and 33 feet at 120° F.

EXAMPLE 3

| | Parts by weight |
|---|---|
| Poly(oxytetramethylene) glycol-toluene diisocyanate prepolymer having a molecular weight of about 900 | 65 |
| Poly(oxytetramethylene) glycol-toluene diisocyanate prepolymer having a molecular weight of about 1320 | 35 |
| 1,4-butanediol | 7.8 |
| Trimethylolpropane | 1 |

The poly(oxytetramethylene) glycol-toluene diisocyanate prepolymer mixture was heated to 212° F. and degassed for about 2 hours. Both the 1,4-butanediol and the trimethylolpropane were added at 200° F. to the prepolymer and the mixture further degassed for about 5 minutes. Laminates were prepared by pouring the hot mixture on a first glass plate having a compressible sealing gasket around the perimeter, which was previously heated to 285° F., and placing a second heated glass plate having the same dimensions upon the first. The plates were held apart with spacers. The final laminate interlayer thickness was 0.018 inch. After heating for 1 hour at 285° F., the laminates were stored at room temperature for 24 hours and then tested for impact resistance. Laminates made in this manner withstood the impact from a one-half pound ball when dropped from a height of at least 32 feet when tested at 120° F., at least 50 feet when tested at 0° F., and at least 50 feet when tested at room temperature.

EXAMPLE 4

In this example a poly(oxytrimethylene) glycol is employed. A prepolymer was prepared in the manner described above by reacting 355 parts of toluene diisocyanate with 900 parts of poly(oxytrimethylene) glycol having an average molecular weight of about 900. Laminates were prepared, using the procedure of Example 1, with the following polyurethane composition:

| | Parts by weight |
|---|---|
| Poly(oxytrimethylene) glycol prepolymer (6.61% NCO) | 700 |
| Trimethylolpropane | 49.2 |

One laminate was made with a 60 mil thick interlayer layer and was used in the heat resistance test, while others having an interlayer about 20 mils thick were used in impact resistance tests. Each laminate was made with 12 inch by 12 inch sheets of ⅛ inch plate glass and was cured for 6 hours at 285° F. The laminates were clear, light amber in color, and had excellent properties, including impact resistance of 45 feet at 0° F. and 12 feet at 120° F. In the heat resistance test, the laminate withstood 365° F. for 25 hours before bubbling occurred.

EXAMPLE 5

In this example the curing agent was a polyether polyol made by reacting 1 mole of sorbitol with 10 moles of propylene oxide and having a hydroxyl equivalent of 495. Laminates were produced as in Example 4, using a polyurethane composition of 700 parts of Prepolymer A and 117.6 parts of the sorbitol polyether polyol. The laminates had satisfactory properties, including impact resistance of 40 feet at 0° F. and 11 feet at 120° F. In the heat resistance tests, one small bubble was noted after heating the laminate for 20 hours at 365° F., but no additional bubbles appeared until the laminate had been heated for a total of 44 hours at this temperature.

EXAMPLE 6

Laminates were prepared as in Example 1, using several formulas in which Prepolymer B was cured with a curing system comprising trimethylolpropane and a diol, and also containing a plasticizer. The compositions were as follows (in parts by weight):

| | A | B |
|---|---|---|
| Prepolymer B | 80.00 | 86.95 |
| 1,4-cyclohexane-dimethanol | 11.22 | 11.89 |
| Trimethylolpropane | 1.16 | 1.22 |
| Dioctylphthalate | 20.00 | |
| Triethyleneglycol di(2-ethylhexoate) | | 13.05 |
| Ultraviolet absorber (Tinuvin P [1]) | 0.25 | |

[1] Substituted benzotriazole.

Both laminates had suitable properties, with that made from Formula B being somewhat preferable.

EXAMPLES 7–15

Laminates were prepared by the procedure set forth in Example 3, using poly(oxytetramethylene) glycol-toluene diisocyanate prepolymers and mixtures of prepolymers, prepared from polyglycols having varying molecular weights. The average molecular weight of the polyglycol is determined by titrating a known amount of the prepolymer or mixture of prepolymers with a secondary monoamine, such as dibutyl amine, to determine equivalent weight. The molecular weight of the polyglycol is equal to twice the equivalent weight minus the accumulated weight of the reacted diisocyanate. The data are set forth in Table III.

TABLE III
[Examples 7-15]

| Example | Average molecular weight of glycol | Parts by weight of prepolymer | Curing Agent Compound | Parts by weight | Curing time, 285° F. (hours) | Impact Resistance 0° F. (feet) | Impact Resistance 120° F. (feet) |
|---|---|---|---|---|---|---|---|
| 7 | 555 | 100 | Trimethylolpropane / Castor oil / 1,4-butanediol | 0.5 / 24.7 / 6.5 | 3 | 50 | 18 |
| 8 | 668 | 100 | Sorbitol / 1,4-butanediol | 0.7 / 7.8 | 1.25 | 24 | 40 |
| 9 | 668 | 100 | Trimethylolpropane / 2-methyl-2-n-propyl-1,3-propanediol | 1.08 / 11.1 | 3 | 18 | 30 |
| 10 | 555 | 100 | Castor oil / 1,4-butanediol | 49.5 / 6.5 | 3 | 18 | 18 |
| 11 | 651 | 100 | Trimethylolpropane / 1,4-butanediol | 0.98 / 7.97 | 1.25 | 35 | 30 |
| 12 | 668 | 100 | Trimethylolpropane / 1,5-butanediol | 1.0 / 9.0 | 1.25 | 40 | 30 |
| 13 | 668 | 100 | Trimethylolpropane / 1,4-butanediol | 0.88 / 7.0 | 1.25 | 35 | 35 |
| 14 | 982 | 100 | Trimethylolpropane / 1,4-butanediol | 0.923 / 5.58 | 1.25 | 50 | 18 |
| 15 | 1,722 | 100 | Trimethylolpropane / 1,4-butanediol | 1.0 / 3.5 | 1.25 | 40 | 18 |

EXAMPLE 16

|  | Parts by weight |
|---|---|
| Poly(oxytetramethylene) glycol-toluene diisocyanate prepolymer having a molecular weight of about 900 | 55 |
| Poly(oxytetramethylene) glycol-toluene diisocyanate prepolymer having a molecular weight of about 1330 | 45 |
| 1,4-butanediol | 7.5 |
| Diamino diphenyl sulfone | 1.4 |

The poly(oxytetramethylene) glycol-toluene diisocyanate prepolymer was heated at 175° F.–200° F. and evacuated for 2 hours while stirring. The butanediol was heated to 175° F., evacuated for 4 hours, and admixed with the polyamine; this mixture was added at a temperature of 175° F. to the prepolymer mixture, and the resulting composition evacuated for 3 minutes. This composition was then poured into a glass plate having its perimeter lined with a compressible gasket and thickness spacers. The glass plate had previously been heated to a temperature of 25° F. A second preheated glass plate having the same dimensions as the first was placed on the first and the structure was then heated at 285° F. for 1 hour. This laminate, having an interlayer 18 mils thick, withstood the impact from a half-pound ball when dropped from a height of at least 50 feet, the laminate being tested at 0° F., and similar laminates withstood half-pound balls dropped from 50 feet at room temperature and 30 feet at 120° F.

EXAMPLES 17–24

Laminates prepared by the procedure set forth in Example 16, using poly(oxytetramethylene) glycol-toluene diisocyanate prepolymers prepared from toluene diisocyanate and polyglycols having varying molecular weights. The compositions and results are given in Table IV.

The above examples illustrate the invention in several of its embodiments. Other laminates with suitable properties are obtained in a similar manner by substituting other poly(oxypolymethylene) glycols and other curing agents for those described in the examples. Also, other methods of producing the interlayer and laminates can be utilized and various additives and the like can be employed in the compositions.

It is at times advantageous to coat the surface of the glass sheets of the laminate with a material which further improves the adhesion of the glass to the resinous interlayer under high humidity or other severe conditions. Water-soluble and water-insoluble derivatives of certain polyorganosiloxanes may be employed to further improve the adhesion at the resin-glass interface. Examples of commercially available silicones for this purpose include SS-2DN, obtained from Cowles Chemical Company, and Z-4141, obtained from Dow Corning Company. These reagents are applied to the glass surface by dipping or spraying followed by drying.

It also can be desirable to coat the glass sheets with a material having low heat transmissivity, thereby making the laminates especially useful for use in areas exposed to sunlight, as in windshields or the like. Various metal oxides are capable of producing transparent films which reflect heat rays. By applying film-forming compositions having a metal salt, a metal organic compound, or mixtures thereof capable of forming a metal oxide film, films which moderate the radiant energy transmittance of viewing closures can be produced.

Typical metal oxide coatings of low heat transmissivity are those containing tin oxide, indium oxide, cadmium oxide, titanium oxide, or mixtures thereof, or mixtures of tin oxide and antimony oxide with or without minor additions of the oxides of bismuth, iron, zinc, cooper, vanadium, chromium, manganese and cobalt. Films con- TABLE IV
[Examples 17-24]

| Example | Average molecular weight of glycol | Parts by weight of prepolymer | Curing Agent Compound | Parts by weight | Curing time, 285° F. (hours) | Impact Resistance 0° F. (feet) | Impact Resistance 120° F. (feet) |
|---|---|---|---|---|---|---|---|
| 17 | 1,053 | 100 | Diallylmelamine / 1,4-butanediol | 1.2 / 7.5 | 3 | 50 | 30 |
| 18 | 1,053 | 100 | Diamino diphenyl sulfone / 1,4-butanediol | 1.4 / 7.5 | 3 | 50 | 30 |
| 19 | 1,722 | 100 | Diamino diphenyl sulfone / 1,4-butanediol | 5.1 / 2.25 | [3] 3 | 50 | 22 |
| 20 | 3,000 | 100 | MOCA [1] | 4.0 | 3 | 40 | 18 |
| 21 | 3,000 | 100 | MOCA [1] / Trimethylolpropane | 4.27 / 1.5 | 3 | 18 | 18 |
| 22 | 550 | 100 | Diamino diphenyl sulfone / Poly(oxytetramethylene) glycol | 10.95 / 31.0 | 3 | 18 | 18 |
| 23 | 980 | 100 | MOCA [1] / Trimethylolpropane | 9.0 / 0.67 | 3 | 18 | 18 |
| 24 | 550 | 100 | MOCA [1] / Dimer glycol [2] | 4.41 / 44.3 | 3 | 18 | 18 |

[1] 4,4'-methylene bis(2-chloroaniline).
[2] Reduction product of dimerized linoleic acid.
[3] 250° F.

taining cobalt oxide with or without minor proportions of nickel oxide and iron or tin oxide are also particularly effective.

According to the provisions of the patent status, there are described above the invention and what are now considered to be its best embodiments. However, within the scope of the appended claims, it is to be understood that the invention can be practiced otherwise than as specifically described.

We claim:

1. A laminated glass article comprising at least one solid glass sheet and bonded thereto an adherent layer of a polyurethane reaction product of a poly(oxypolymethylene) glycol, an organic polyisocyanate and a curing agent containing at least two active hydrogen atoms per molecule; said poly(oxypolymethylene) glycol containing oxypolymethylene groups in which a linear chain of from about 3 to about 6 carbon atoms separate each pair of adjacent oxygen atoms.

2. The glass article of claim 1 in which said poly(oxypolymethylene) glycol is poly(oxytetramethylene) glycol.

3. The laminated glass article of claim 1 in which said curing agent comprises a polyol.

4. The laminated glass article of claim 3 in which said polyol comprises trimethylolpropane.

5. The laminated glass article of claim 1 in which said curing agent comprises a polyamine.

6. The laminated glass article of claim 1 in which said curing agent comprises a polyamine and a polyol.

7. The laminated glass article of claim 1 in which said curing agent comprises a polyol containing at least 3 hydroxyl groups and a diol.

8. A laminated glass article comprising at least one solid glass sheet and bonded thereto a cured in situ adherent layer of a polyurethane reaction product of (1) an isocyanato-terminated polyether adduct of an organic diisocyanate and a poly(oxypolymethylene) glycol and (2) a curing agent containing at least two active hydrogen atoms per molecule; said poly(oxypolymethylene) glycol containing oxypolymethylene groups in which a linear chain of from about 3 to about 6 carbon atoms separate each adjacent pair of oxygen atoms.

9. The laminated glass article of claim 8 in which said curing agent comprises a polyol.

10. The laminated glass article of claim 9 in which additional organic diisocyanate is present.

11. The laminated glass article of claim 8 in which said poly(oxypolymethylene) glycol is poly(oxytetramethylene) glycol.

12. The laminated glass article of claim 8 in which said poly(oxypolymethylene) glycol is poly(oxytrimethylene) glycol.

13. A safety glass laminate comprising at least two solid glass sheets bonded together by cured in situ interposed layers of a polyurethane composition comprising the reaction product of poly(oxytetramethylene) glycol having an average molecular weight from about 550 to about 3000, a diisocyanate and a curing agent comprising a polyamine.

14. A safety glass laminate comprising two outer solid sheets of glass bonded to a cured in situ central layer of a polyurethane composition comprising the reaction product of a poly(oxytetramethylene) glycol having an average molecular weight of from about 550 to about 3000, a diisocyanate and a curing system comprising a polyamine containing at least 2 reactive amine groups and a polyol containing from 2 to 10 hydroxyl groups.

15. The safety glass laminate of claim 14 wherein the diisocyanate is toluene diisocyanate, the polyamine is 4,4'-methylene-bis(2-chloro-aniline) and the polyol is an alkylene glycol.

16. The safety glass laminate of claim 14 wherein the diisocyanate is toluene diisocyanate, the polyamine is diamino diphenyl sulfone and the polyol is an alkylene glycol.

17. The safety glass laminate of claim 14 wherein the diisocyanate is toluene diisocyanate, the polyamine is diallylmelamine and the polyol is an alkylene glycol.

18. A safety glass laminate comprising at least two solid glass sheets bonded together by interposed layers of a polyurethane composition comprising the reaction product of a poly(oxytetramethylene) glycol having an average molecular weight of from about 550 to about 1800, a diisocyanate and a curing system comprising a polyol containing at least 3 hydroxyl groups and a diol.

19. The safety glass laminate of claim 18 wherein the diisocyanate is toluene diisocyanate and the polyol is trimethylolpropane.

20. The safety glass laminate of claim 18 wherein the diisocyanate is toluene diisocyanate and the polyol is castor oil.

21. The safety glass laminate of claim 18 wherein the diisocyanate is toluene diisocyanate and the polyol is sorbitol.

22. The safety glass laminate of claim 18 wherein the diisocyanate is toluene diisocyanate, the polyol is trimethylolpropane and the diol is an alkylene glycol.

23. The safety glass laminate of claim 18 wherein the diisocyanate is toluene diisocyanate, the polyol is trimethylolpropane and the diol is 2-methyl-2-n-propyl-1,3-propane diol.

24. A method of producing a laminated glass article which comprises contacting at least one solid glass sheet with a curable polyurethane composition and curing the composition while in contact with the glass sheet; said polyurethane composition comprising a poly(oxypolymethylene) glycol, an organic polyisocyanate and a curing agent containing at least about two active hydrogen atoms per molecule; said poly(oxypolymethylene) glycol containing oxypolymethylene groups in which a linear chain of from about 3 to about 6 carbon atoms separate each adjacent pair of oxygen atoms.

25. The method of claim 24 in which said poly(oxypolymethylene) glycol is poly(oxytetramethylene) glycol.

26. The method of claim 24 in which said poly(oxypolymethylene) glycol is poly(oxytrimethylene) glycol.

27. The method of claim 24 in which said organic polyisocyanate is toluene diisocyanate.

28. The method of claim 24 in which said curing agent is a polyol.

29. The method of claim 28 in which said polyol comprises trimethylolpropane.

30. The method of claim 24 in which said curing agent comprises a polyamine.

31. The method of claim 24 in which said curing agent comprises a polyamine and a polyol.

32. The method of claim 24 in which said curing agent comprises a polyamine containing at least 3 hydroxyl groups and a diol.

33. A method of producing laminated safety glass which comprises casting a curable polyurethane composition between spaced solid glass sheets and curing said composition while in contact with said glass sheets; said polyurethane composition comprising (1) an isocyanato-terminated polyether adduct of an organic diisocyanate and a poly(oxypolymethylene) glycol and (2) a curing agent containing at least about two active hydrogen atoms per molecule; said poly(oxypolymethylene) glycol containing oxypolymethylene groups in which a linear chain of from about 3 to about 6 carbon atoms separate each adjacent pair of oxygen atoms.

34. The method of claim 33 in which said curing agent comprises a polyol.

35. The method of claim 34 in which said curing is carried out in the presence of additional organic diisocyanate.

36. The method of claim 33 in which said poly(oxypolymethylene) glycol is poly(oxytetramethylene) glycol.

(References on following page)

References Cited

UNITED STATES PATENTS

| | | | |
|---|---|---|---|
| 3,135,645 | 6/1964 | Burkley et al. | 161—165 |
| 2,864,780 | 12/1958 | Katz et al. | 161—190 |
| 3,307,958 | 3/1967 | Earl | 106—49 |
| 2,901,467 | 8/1959 | Croco. | |
| 2,917,489 | 12/1959 | Gladding et al. | |
| 2,929,794 | 3/1960 | Simon et al. | |
| 2,929,800 | 3/1960 | Hill. | |
| 2,989,512 | 6/1961 | Nischk. | |
| 3,072,582 | 1/1963 | Frost | 161—190 |

FOREIGN PATENTS 543,986    7/1957    Canada.

WILLIAM J. VAN BALEN, Primary Examiner

U.S. Cl. X.R.

117—124; 156—99, 106; 161—193